United States Patent [19]
Nally et al.

[11] Patent Number: 5,748,968
[45] Date of Patent: May 5, 1998

[54] REQUESTING DEVICE CAPABLE OF CANCELING ITS MEMORY ACCESS REQUESTS UPON DETECTING OTHER SPECIFIC REQUESTING DEVICES SIMULTANEOUSLY ASSERTING ACCESS REQUESTS

[75] Inventors: Robert Marshall Nally; Pete Edward Nelsen, both of Plano; Douglas Hamilton, Allen; Douglas Michael Berk, Plano, all of Tex.

[73] Assignee: Cirrus Logic, Inc., Fremont, Calif.

[21] Appl. No.: 583,390

[22] Filed: Jan. 5, 1996

[51] Int. Cl.[6] ............................................. G06F 13/36
[52] U.S. Cl. ........................ 395/728; 395/730; 395/732; 395/876; 395/856
[58] Field of Search ............................ 395/728, 729, 395/730, 731, 732, 876, 877, 856, 860, 861

[56] References Cited

U.S. PATENT DOCUMENTS

| | | | |
|---|---|---|---|
| 4,449,183 | 5/1984 | Flahive et al. | 364/200 |
| 5,168,568 | 12/1992 | Thayer et al. | 395/725 |
| 5,193,194 | 3/1993 | Gruender, Jr. et al. | 395/725 |
| 5,218,680 | 6/1993 | Farrell et al. | 395/200.45 |
| 5,265,211 | 11/1993 | Amini et al. | 395/325 |
| 5,412,792 | 5/1995 | Hasegawa | 395/425 |
| 5,440,683 | 8/1995 | Nally et al. | 395/162 |
| 5,442,588 | 8/1995 | Runas | 365/222 |
| 5,485,586 | 1/1996 | Brash et al. | 395/292 |
| 5,506,972 | 4/1996 | Heath et al. | 395/293 |

*Primary Examiner*—Jack B. Harvey
*Assistant Examiner*—Ario Etienne
*Attorney, Agent, or Firm*—Fulbright & Jaworski; Steven A. Shaw

[57] ABSTRACT

A memory bandwidth allocation scheme in a computer system having a unified memory architecture. When a first device requesting access to a resource detects that two higher priority devices are also requesting access to the same resource, the first device shuts itself down. Accordingly, the first device deactivates its access request signals and clears its buffers. Then, the first device reactivates itself when it receives a graphics VSYNC signal. This allocation scheme ensures that the arbiter will not get stuck in a loop serving only high priority requests and not serving lower priority requests.

30 Claims, 1 Drawing Sheet

REQUESTING DEVICE CAPABLE OF CANCELING ITS MEMORY ACCESS REQUESTS UPON DETECTING OTHER SPECIFIC REQUESTING DEVICES SIMULTANEOUSLY ASSERTING ACCESS REQUESTS

CROSS-REFERENCE TO RELATED APPLICATIONS

The following copending and coassigned United States patent applications contain related material and are incorporated herein by reference:

U.S. patent application Ser. No. 08/577,351, entitled "Dynamic Device Allocation for Arbitration," filed Dec. 22, 1995;

U.S. patent application Ser. No. 08/579,068, entitled "SDRAM Memory Controller Supporting Single Data Accesses" filed Dec. 22, 1995;

U.S. patent application Ser. No. 08/577,584, entitled "SDRAM Memory Controller with Multiple Arbitration Points" filed Dec. 22, 1995; and U.S. patent application Ser. No. 08/577,579, entitled "SDRAM DIMM Presence Detect Interface" filed Dec. 22, 1995.

TECHNICAL FIELD OF THE INVENTION

The present invention pertains in general to a computer system having a unified memory architecture and more particularly to a memory bandwidth allocation scheme in such a computer.

BACKGROUND OF THE INVENTION

A computer having a unified memory architecture (UMA) has a single main memory accessed by all system devices, including a central processing unit (CPU) and a graphics controller. Each device accesses memory by issuing memory access requests having certain priorities. Arbitration circuitry arbitrates among the memory access requests and grants access to the requesting device having the highest priority.

If the computer system is a multimedia-oriented system and can process live video data received from a camera or a video cassette recorder ("VCR"), then there are at least five devices in the computer system than can issue memory access requests. In order of priority, these devices are the: cathode ray tube first-in-first-out buffer ("CRT FIFO"), video first-in-first-out buffer 1 ("VID FIFO 1"), video first-in-first-out buffer 2 ("VID FIFO 2"), CPU, and bit blasting ("BitBLT") engine. The CRT FIFO is used to supply data to the display screen and cannot tolerate interruption of its data stream. The VID FIFOs are special FIFO's that must handle non-interruptable streaming video data. Therefore, the CRT FIFO and VID FIFOs have two levels of memory access request signals: low water mark (LWM) and high water mark (HWM). The HWM signal indicates that a FIFO could accept more data. The LWM signal is a critical request and indicates that the FIFO might run out of data. A memory access request signal from the CPU or BitBLT engine has a priority greater than HWM requests but less than LWM requests.

The VID FIFOs will always issue a HWM signal before a LWM signal. This order is because a FIFO will issue a HWM signal when it can accept more data, then issue a LWM signal when its need for data becomes critical. Once the FIFO is granted memory access, its LWM signal will eventually go inactive. The FIFO's HWM signal, however, will stay active until the device cannot accept any more data.

The VID FIFOs are utilized when the computer system captures or plays back video. If heavy memory activity by the CPU and/or the BitBLT engine should occur while the computer system is playing video, the arbitration circuitry may never grant the HWM requests because it will be constantly serving the LWM, CPU, and BitBLT engine requests.

If this condition continues for too long, all three FIFO LWM (VID 1, VID 2, and CRT) requests could go active. When all three LWM request are active, the arbitration circuitry will first grant access to the CRT FIFO until its LWM request goes inactive, then grant access to VID FIFO 1, the next highest priority request, then grant access to VID FIFO 2. In such a situation, the CRT FIFO LWM request could reactivate by the time the VID FIFO 2 LWM request is served. Accordingly, the arbitration circuitry gets stuck cycling between the LWM requests and never serves the lower priority requests. As a result, the computer system locks up because these three FIFOs are servicing three continuous data streams supplying a steady rate of data to and from memory and the other FIFOs in the system never get served. Therefore, the CPU and BitBLT engine never get data and sit idle.

Therefore, there is a need in the art for a memory bandwidth allocation scheme that efficiently allocates memory bandwidth requirements. More particularly, there is a need for a memory bandwidth allocation scheme that detects when the arbiter is merely cycling between the three FIFO LWM requests so that the cycle can be broken and other devices can get memory access.

SUMMARY OF THE INVENTION

The above and other needs are met by a video FIFO that can detect when its own LWM request and other two FIFO LWM requests are active. In response, the video FIFO removes its own request and shuts down until the next graphics vertical synchronization ("VSYNC") signal occurs. Because this video FIFO is handling continously streaming video data, this shutdown and restart must be done gracefully in order to minimize the visual effects on the display. Moreover, the way the FIFO shuts down and how this shutdown affects the other hardware in the system depends on the type of operation being performed by the video hardware. Therefore, the shutdown not only has to be graceful but also must be intelligent.

More specifically, there are three FIFOs capable of issuing LWM memory access requests: CRT FIFO, VID FIFO 1, and VID FIFO 2. These memory access requests are arbitrated by an arbitration controller. VID FIFO 2 monitors the arbitration controller and detects when all three FIFOs have issued LWM access requests.

When all three LWM requests are active, VID FIFO 2 deactivates its LWM and HWM requests. Then, when the next graphics VSYNC signal occurs, VID FIFO 2 reasserts its memory access requests.

VID FIFO 2 can be used to either playback or capture video. When used for playback, the video hardware contains a second display line used for vertical interpolation while zooming. If a shutdown occurs during playback, the computer system uses line replication, rather than interpolation, to perform the zoom. When used to capture, VID FIFO 2 receives a signal from an outside source. If a shutdown occurs during capture, the video hardware merely drops one or more video frames.

3

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
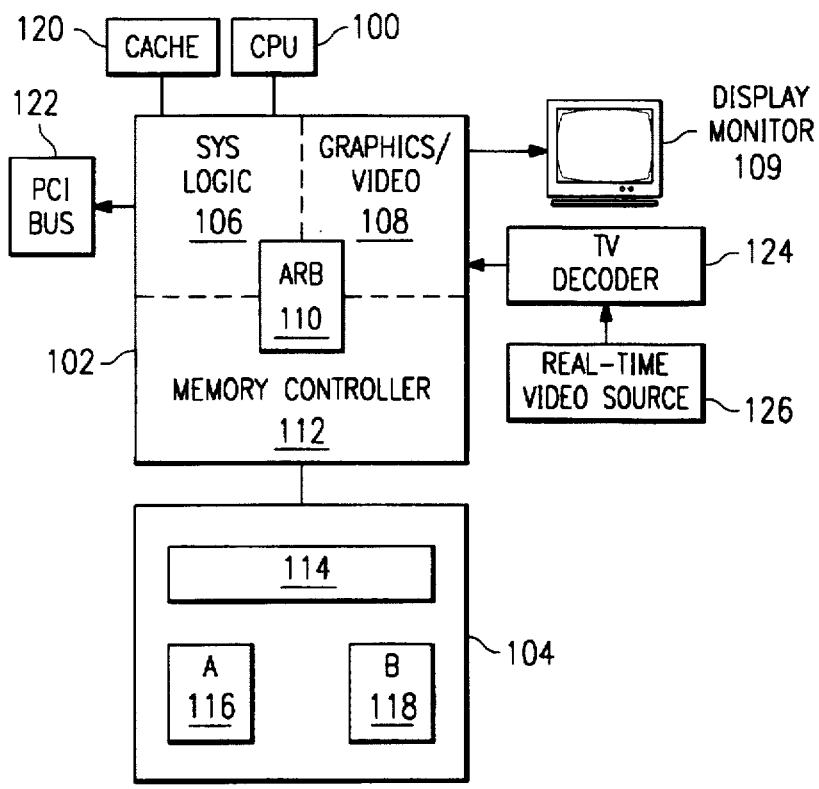
FIG. 1 illustrates a high-level functional block diagram of a computer system having a unified memory architecture.

FIG. 1 illustrates a high-level functional block diagram of a computer system having a unified memory architecture (UMA) according to the present invention. Shown are central processing unit (CPU) 100 coupled to integrated controller 102. Integrated controller 102, in turn, is coupled to synchronous dynamic random access memory (SDRAM) 104.

CPU 100 is preferably an X86 compatible CPU. However, the present invention will work equally well with any standard CPU capable of issuing memory access requests as described below.

Integrated controller 102 contains system logic 106, graphics/video controller (hereafter referred to as "graphics controller") 108, arbitration controller 110, and memory controller 112. System logic 106 contains the logic necessary to control the basic operation of the computer system. Thus, system logic receives memory access requests from CPU 100, manages memory cache 120, and controls PCI bus 122.

Graphics controller 108 controls the generation of graphics data on display monitor 109. Graphics controller 108 may receive video data from television signal decoder 124 connected to real-time video source 126 or display graphics data received from CPU 100.

Arbitration controller 110 receives memory requests from system logic 106 and graphics controller 108. Then, arbitration controller 110 arbitrates among and grants the highest priority request. Once a device's access request is granted, that device is connected directly to memory controller 112 and uses it 112 to access memory.

It is important to note that arbitration controller 110 arbitrates among all devices in the computer system capable of issuing memory access requests. As discussed above, these devices include system logic 106 and graphics controller 108. In addition, devices such as peripheral cards, DMA controllers, separate video controllers, and multimedia adapters can send memory access requests to arbitration controller 110 via system logic 106. A device capable of signalling an access request is generically referred to as a "requesting device."

Likewise, it must be noted that the arbitration scheme disclosed herein could be used to arbitrate access to any shared resource within the computer system. Accordingly, the term "resource" is used to generically refer to a system resource, such as memory 104, to which access can be arbitrated.

SDRAM 104 includes digital interface 114 and has two banks of DRAM: bank A 116 and bank B 118. To access DRAM banks 116 and 118, commands are sent to digital interface 114. Digital interface 114 translates the commands into regular DRAM bus cycles and then accesses DRAM banks 116, 118.

Figure 2:
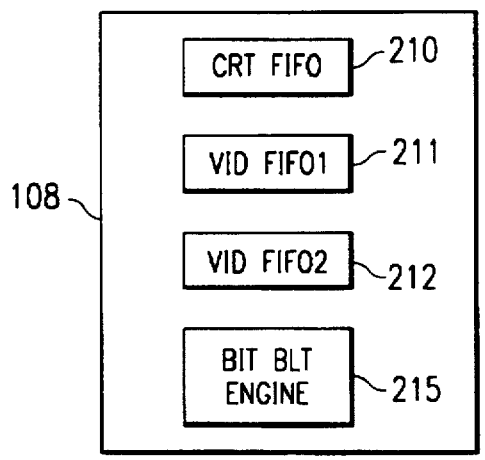
FIG. 2 illustrates a functional block diagram of the operative components of a graphics controller.

FIG. 2 shows a functional block diagram of the operative components of graphics controller 108. Shown are three video FIFOs, or buffers: CRT FIFO 210, VID FIFO1 211, and VID FIFO2 212. In addition, graphics controller 108 contains BitBLT engine 215.

CRT FIFO 210 holds graphics data being read out of memory for display on a display screen. CRT FIFO 210 must have a high priority because the screen will be corrupted if it runs empty.

VID FIFO1 211 reads data from memory and is used to playback video data from a data source associated with the computer system, such as a hard drive or CD-ROM. VID FIFO1 211 is also used to read and playback captured video data.

VID FIFO2 212 can read data from or write data to memory. Thus, VID FIFO2 212 can be used for both playback and video capture. When VID FIFO2 212 is used to playback video, it holds a second line used for vertical interpolation (zooming) of the video picture. When VID FIFO2 212 is used for video capture, it captures data from an external source like a tuner, VCR, or similar device. External data comes into VID FIFO2 212 and is written to display memory. BitBLT engine 215 is a logical construct used to accelerate the block transfer of data on the computer screen.

Figure 3:
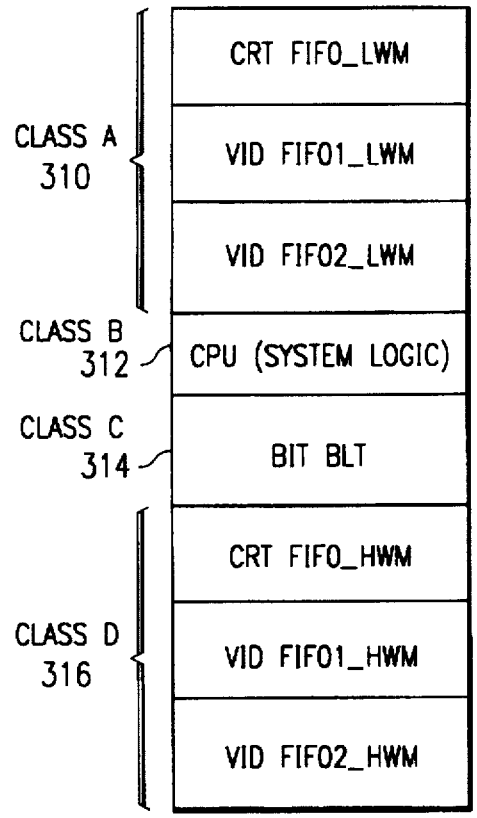
FIG. 3 is a chart showing the relative priority of memory access requests.

FIG. 3 is a chart showing the relative priority of memory requests from CRT FIFO 210, VID FIFO1 211, VID FIFO2 212, system logic 106 (including CPU 100 requests), and BitBLT engine 215. The memory requests are grouped, in descending order of priority, as Class A 310, Class B 312, Class C 314, and Class D 316 requests.

Class A 310 requests are the highest priority requests and include the CRT FIFO 210, VID FIFO1 211, and VID FIFO2 212 low water mark (LWM) requests. A LWM request, or signal, is a critical request and indicates that the FIFO 210-212 is about to run out of data. Note that VID FIFO2 212 can either read or write data. Therefore, VID FIFO2 212's LWM can indicate that either the FIFO 212 is starting to get empty or the FIFO 212 is starting to get full.

Class B 312 requests include CPU 100 requests for system logic 106. In addition, any bus mastering peripheral would have a class B 312 request when interfacing with memory 104 through system logic 106. BitBLT engine 215 is the only class C 314 request.

Class D 316 requests are the lowest priority requests and include the CRT FIFO 210, VID FIFO1 211, and VID FIFO2 212 high water mark (HWM) requests. A HWM request indicates that the FIFO 210-212 can accept more data. Once again, note that VID FIFO2 212 can either read or write data. Therefore, VID FIFO2 212's HWM indicates either that the FIFO 212 can accept more data or can write more data.

The above-described request signals are arbitrated by arbitration controller 110. The function of arbitration controller 110 can be explained by considering its behavior with respect to CRT FIFO 210. Note that CRT FIFO 210 is selected only as an example.

When CRT FIFO 210 is totally full of data from memory 104, both its HWM and LWM requests are inactive. As data passes out of the FIFO 210 and to the display, the HWM request will eventually go active. As stated above, the HWM request indicates that some data has been taken out of the FIFO 210 and the FIFO 210 can accept more data. However, it is not critical that CRT FIFO 210 get data right away. Since only CRT FIFO 210's HWM request is active, the class A 310, B 312, and C 314 devices would get memory access ahead of CRT FIFO 210 if they were to go active.

As CRT FIFO 210 continues to empty, it eventually gets to the point where it trips the LWM request. Once CRT FIFO 210's LWM request goes active, it becomes the highest priority request and will be granted immediately. When the request is granted, the CRT FIFO 210 begins to read data from memory. Eventually, the CRT FIFO 210 becomes filled to the point where its LWM request goes inactive.

Note that the high and low water marks for a FIFO can be chosen to reflect the needs of the computer system. In addition, the high and low water marks for each FIFO can be set individually. Thus, the present invention does not require fixed points for the high and low water marks.

As discussed above, heavy memory activity by CPU 100 or bitBLT engine 215 while graphics controller 108 is playing back video can lead to a situation wherein all three class A 310 LWM requests are active. In such a case, arbitration controller 110 can get stuck in a loop servicing only class A 310 requests. A preferred embodiment of the present invention uses VID FIFO2 212 to alleviate this situation.

In the preferred embodiment, VID FIFO2 212 monitors arbitration controller 110 to detect when all three class A 310 requests are active. When all three requests are active, VID FIFO2 212 deactivates both of its request signals and clears its FIFO. In effect, VID FIFO2 212 shuts itself down.

VID FIFO2 212 then waits until a graphics VSYNC signal is received from graphics controller 108. As is well known in the art, the VSYNC signal indicates the vertical retrace interval—the time during which the monitor's electron beam moves from the lower right of the monitor to the upper left to begin scanning a new line. When the VSYNC signal is received, VID FIFO2 212 reactivates itself, reasserts its LWM and HWM memory access requests, and resumes normal operation. If the CRT FIFO 210 LWM and VID FIFO1 211 LWM requests are active upon VID FIFO2 212's reactivation, then VID FIFO2 212 will again deactivate both of its requests and clear its FIFO.

Although other FIFOs or devices could be shut down as described above, the preferred embodiment shuts down VID FIFO2 212. As stated above, VID FIFO2 212 can read data from or write data to memory. When VID FIFO2 212 is used to read data from memory, as in the case of video playback, it 212 contains a second line used for vertical interpolation when zooming. When VID FIFO2 212 is in the shutdown state, line replication, rather than interpolation, is used to perform any required vertical zooming. Since the other FIFOs 210, 211 should quickly fill past their LWMs, graphics controller 108 should only use replication for a frame or two.

If VID FIFO2 212 shuts down while being used to write data to memory, as in the case of video capture, one or more video frames will be dropped. The actual number of dropped video frames depends on the length of time required for the other FIFOs 210, 211 to fill above their LWMs. Regardless, the dropped data will probably not be noticeable to a viewer. Therefore, shutting down VID FIFO2 212 for relatively short amounts of time has a minimal effect on the video picture.

Although the present invention and its advantages have been described in detail, it should be understood that various changes, substitutions and alterations can be made herein without departing from the spirit and scope of the invention as defined by the appended claims.

We claim:

1. A requesting device for monitoring an arbitration controller that arbitrates access to a resource in a computer system having the requesting device and a plurality of other requesting devices, comprising:

circuitry for detecting when the requesting device and particular ones of the other requesting devices are asserting access requests;

circuitry for canceling the access requests of the requesting device when the circuitry for detecting detects that the requesting device and the particular ones of the other requesting devices are asserting access requests; and circuitry for regenerating the access requests from the requesting device when a signal goes active.

2. The requesting device of claim 1, wherein the signal comprises a graphics VSYNC signal.

3. The requesting device of claim 1, wherein each requesting device comprises a FIFO.

4. The requesting device of claim 1, wherein the other requesting devices are capable of asserting HWM and LWM access requests and the circuitry for detecting comprises:

circuitry for detecting when the particular ones of the other requesting devices are asserting LWM access requests.

5. The requesting device of claim 1, wherein the resource is a memory.

6. The requesting device of claim 5, wherein the memory is an SDRAM.

7. The requesting device of claim 1, wherein the circuitry for canceling the access requests of the requesting device further comprises:

circuitry for clearing a FIFO associated with the requesting device.

8. A method of arbitrating access to a resource in a computer system having a plurality of requesting devices capable of asserting access requests, comprising:

detecting when particular ones of the requesting devices are asserting access requests;

canceling the access requests of a requesting device when the particular ones of the requesting devices are asserting access requests; and regenerating the access requests from the requesting device when a signal goes active.

9. The method of claim 8, wherein the signal comprises a graphics VSYNC signal.

10. The method of claim 8, wherein each requesting device comprises a FIFO.

11. The method of claim 8, wherein the plurality of requesting devices are capable of asserting HWM and LWM access requests and the detecting step comprises the step of:

detecting when the particular ones of the requesting devices are asserting LWM access requests.

12. The method of claim 8, wherein the canceling step further comprises the step of:

clearing a FIFO associated with the requesting device.

13. The method of claim 8, wherein the resource is a memory.

14. The method of claim 13, wherein the memory is an SDRAM.

15. A computer system having a CPU, a resource connected to the CPU, a plurality of requesting devices capable of asserting resource access requests, and arbitration means for arbitrating among the resources access requests, comprising:

means for detecting when particular ones of the requesting devices are asserting resource access requests;

means for canceling the access requests of a requesting device when the means for detecting detects that the particular ones of the requesting devices are asserting resource access requests; and means for regenerating the access requests from the requesting device when a signal is received.

16. The computer system of claim 15, wherein the signal comprises a graphics VSYNC signal.

17. The computer system of claim 15, wherein each requesting device comprises a FIFO.

18. The computer system of claim 15, wherein the plurality of requesting devices are capable of asserting HWM and LWM resource access requests and the means for detecting comprises:

means for detecting when the particular ones of the requesting devices are asserting LWM resource access requests.

19. The computer system of claim 15, wherein the means for canceling the access requests of a requesting device further comprises:

means for clearing a FIFO associated with the requesting device.

20. The computer system of claim 15, wherein the resource is a memory.

21. The computer system of claim 20, wherein the memory is an SDRAM.

22. A method for dynamic allocation of a resource in a computer system among a plurality of requesting devices capable of asserting access requests, comprising the steps of:

(a) detecting when an arbitration controller is servicing only selected requesting devices;

(b) responsive to step (a), canceling access requests of a predetermined requesting device among said selected requesting devices thereof; and (c) causing the predetermined requesting device to regenerate access requests when a signal goes active.

23. The method of claim 22, wherein the signal comprises a graphics VSYNC signal.

24. The method of claim 22, wherein each of the selected requesting devices includes a FIFO.

25. The method of claim 22, wherein the plurality of requesting devices are capable of asserting critical and non-critical access requests and step (a) includes the substep of:

detecting when the particular ones of the selected requesting devices are asserting critical access requests.

26. The method of claim 25, wherein the critical access requests include a LWM access request.

27. The method of claim 25, wherein the non-critical access requests include a HWM access request.

28. The method of claim 22, wherein the canceling step further includes the substep of:

clearing a FIFO associated with the predetermined requesting device.

29. The method of claim 22, wherein the resource is a memory.

30. The method of claim 29, wherein the memory is an SDRAM.

* * * * *